Feb. 24, 1942.  E. H. HAMMOND  2,274,329
MULTIPLE SWITCH INDICATING INSTRUMENT
Filed Aug. 3, 1940
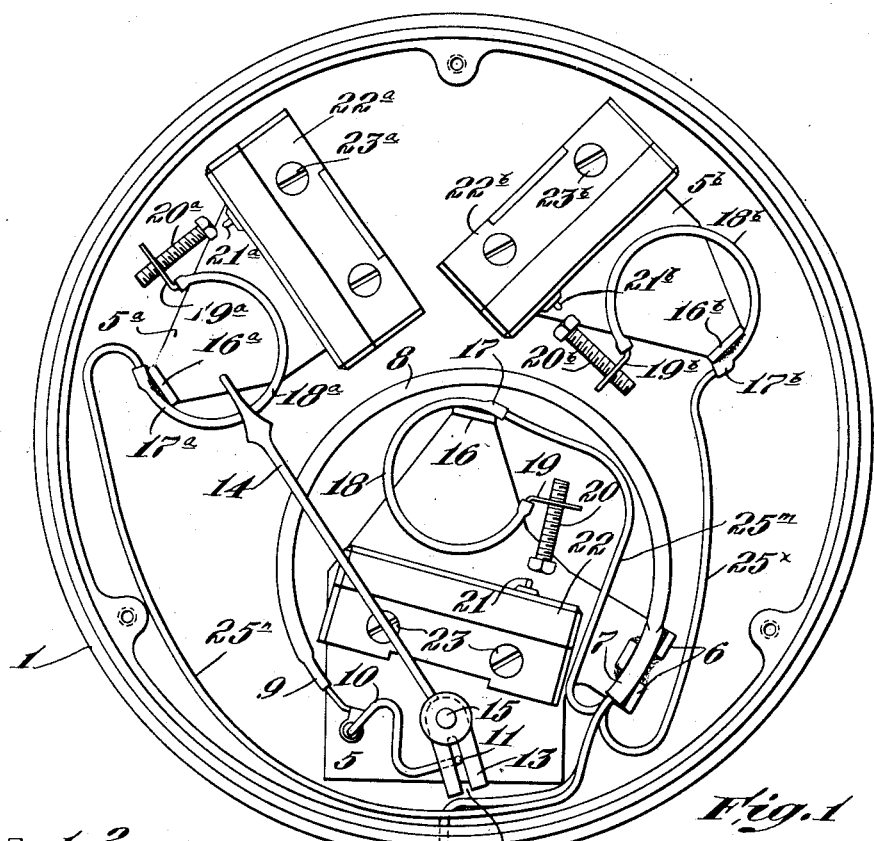
Fig.1
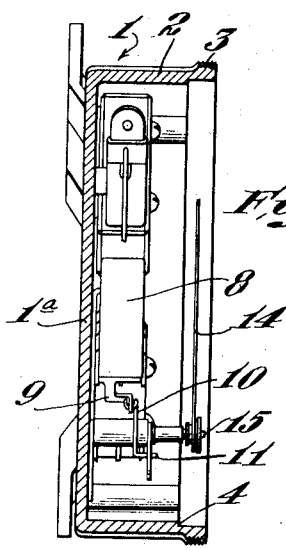
Fig.2
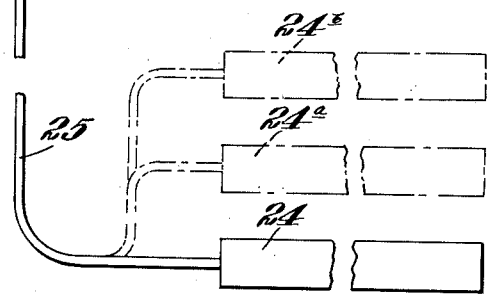
Inventor
Elmer H. Hammond
by Roberts Cushman Woodberry
Att'ys.

Patented Feb. 24, 1942

2,274,329

UNITED STATES PATENT OFFICE 2,274,329

MULTIPLE SWITCH INDICATING INSTRUMENT

Elmer H. Hammond, Fairfield, Conn., assignor to Manning, Maxwell & Moore, Incorporated, New York, N. Y., a corporation of New Jersey Application August 3, 1940, Serial No. 350,615

3 Claims. (Cl. 200—56)

This invention pertains to indicating thermostats, pressurestats or the like, wherein an index or pointer has switch means associated with it, the switch means becoming operative to close or to open an electrical circuit as the index reaches a predetermined point in its path of travel.

The principal object of the invention is to provide an instrument of the class described having provision for indicating temperature or pressure fluctuations and switch means for opening or closing two or more independent electrical circuits in succession, and at predetermined and, if desired, at different temperatures or pressures respectively. A further object of the invention is to provide such an instrument having motor means, wholly independent of that used in actuating the index, for operating the switch means. A further object is to provide an instrument of this class having provision for independent adjustment of the points in the temperature or pressure range at which several circuit closing devices will act. Another object is to provide simple, reliable, and effective means for attaining the objects already noted.

Other and further objects and advantages of the invention will be pointed out hereinafter in the following more detailed description and by reference to the accompanying drawing wherein—

Fig. 1 is a front elevation of an instrument embodying the invention, the cover cap with its transparent panel and the dial being omitted; and Fig. 2 is a diametrical vertical section through the case of Fig. 1, to smaller scale and showing the operative elements of the mechanism in elevation.

Referring to the drawing, the numeral 1 designates the case of the instrument, such instrument being for example an indicating thermostat. The case, as here illustrated, is of a type common in indicating instruments, comprising the rear wall 1ᵃ (Fig. 2) and a cylindrical side wall 2 open at the front and provided at its forward margin with screw threads at 3 for the reception of a removable closure cap and having an internal shoulder 4 at its forward part for engagement by a graduated dial (not shown).

Within the case is arranged a support 5, which, for example may be a piece of sheet metal cut and bent to the proper shape and which, as here illustrated, includes a forwardly directed holding or clamping portion 6 within which is fixedly secured one end 7 of a Bourdon tube 8.

The free end or tip 9 of this tube is provided with a bent wire crank 10 whose free extremity is directed forwardly to form a crank pin 11 which is disposed in an elongate slot 12 in a short arm 13 fixed to the pointer or index 14, the latter turning freely about the axis of a stud or staff 15.

The support 5 has a portion 16 constituting a holder or clamp for the fixed end portion 17 of a second Bourdon tube 18. This latter tube has a bracket 19 secured to its free end and this bracket has a screw-threaded opening for the reception of a contact screw 20. The head of this screw is designed to make contact, at certain times, with a movable actuator 21 forming a part of an electric switch 22. This switch may be of any desired type and so arranged that downward movement of the actuator 21 either closes or breaks an electrical circuit in accordance with the particular design of the switch. This switch is secured to the support 5 by screws 23. Preferably these screws also extend through the support 5 and into the rear wall 1ᵃ of the case.

As here illustrated the case houses additional switch-motor units which are in general similar to the switch-motor unit comprising tube 18 and switch 22. Thus each of the two additional switch-motor units comprises a support 5ᵃ and 5ᵇ respectively having the holding or clamping devices 16ᵃ and 16ᵇ in which are secured the fixed ends 17ᵃ and 17ᵇ of Bourdon tubes 18ᵃ and 18ᵇ respectively. The free ends of these latter tubes are provided with brackets 19ᵃ and 19ᵇ, each having a screw-threaded opening for the reception of a contact screw 20ᵃ at 20ᵇ respectively. The heads of these screws are designed to engage switch actuators 21ᵃ and 21ᵇ respectively forming parts of electrical switches 22ᵃ and 22ᵇ. These switches are secured to the supports 5ᵃ and 5ᵇ by means of screws 23ᵃ and 23ᵇ respectively and preferably these screws also extend through the supports 5ᵃ and 5ᵇ and into the rear wall of the case 1.

As here illustrated the switch-motor unit comprising the tube 18, and the switch 22 is disposed within the arc defined by the index actuating tube 8, while the other switch-motor units are disposed within the case but outside the tube 8. However, by reason of the relative size of the tubes 8, 18, 18ᵃ and 18ᵇ it is possible to locate all of these tubes in substantially the same plane within the case without interference with each other, thus permitting the depth of the case to be kept at a minimum. As here illustrated, two of the additional switch-motor units are arranged within the case outside of the arc defined by the tube 8. For some purposes it may be desirable to use more than two such additional motor-switch units. These motor-switch units may be made of standard size and dimensions and are thus interchangeable with each other and, due to their simplicity, may be made very cheaply. Moreover, since each unit includes both the switch and the motor for actuating it, such units constitute very convenient means for building up instruments of any desired degree of complication and capacity.

The numeral 24 designates a bulb for the reception of a pressure fluid, either in liquid, vapor or gaseous form, such bulb constituting the bulb of the thermometric instrument herein disclosed. The bulb is connected by a conduit 25 to the closed end 7 of the Bourdon tube 8 and from this closed end, conduits $25^m$, $25^n$ and $25^x$ extend to the Bourdon tubes 18, $18^a$ and $18^b$ respectively. All of the Bourdon tubes are thus responsive to the pressure fluctuations in the single bulb 24, and thus whenever the tip of one tube moves, the tips of the other tubes move correspondingly.

However, the connections between the tip 9 of the large tube 8 and the pointer 14 are such that the pointer moves whenever the tip 9 moves. In other words the pointer responds to movement of the tip of the tube 8 throughout the entire range of operation of the tube 8. On the other hand, the contact screw 20, for example, carried by the tube 18, may be adjusted so as initially to be spaced at a greater or lesser distance from the actuator 21 so that as the tip of the tube 18 moves it does not become effective to operate the switch 22 until the index 14 has reached a certain predetermined point upon the dial. Likewise the contact screws $20^a$ and $20^b$ may be adjusted so as to be initially spaced from the actuators $21^a$ and $21^b$ and the several screws 20, $20^a$ and $20^b$ may be differently set, if desired, so as to cause their respective switches to operate at different points in the range of movement of the pointer or index 14.

Thus for example the instrument herein disclosed may be employed as an indicating thermostat for a large electrical transformer. For such purposes, if desired, there may be associated with the bulb 24 other and similar bulbs $24^a$, $24^b$, etc., all connected with the conduit 25 and designed and arranged as disclosed for example in the patent to Noble, No. 2,058,491, October 27, 1936, so that the thermostatic system will respond to the temperature of the hottest of the several bulbs. In employing such an arrangement in connection with an electrical transformer, for instance, each of the several bulbs will be installed with its own heating coil in association with a separate phase winding of the transformer. Under these conditions the index 14 will always indicate the temperature of the hottest of the three bulbs. For this purpose the dial may be graduated from, for example, 0° to 120° C. The switch 22 may then be adjusted to operate at a bulb temperature of 85° C. to start an auxiliary cooling means into action thereby to reduce the transformer temperature; the switch $22^a$ may be adjusted to operate at 100° C. and thereby to operate an alarm, for example a bell or the like so that if the temperature continues to rise after the operation of switch 22 the attendant will be notified and thus take the proper steps to set matters right. Finally the switch $22^b$ may be set to operate at 105° C. and thereby cause a circuit breaker to act, thus automatically cutting off the current through the transformer if steps have not previously been taken effectually to reduce the temperature.

Obviously the switches can be set at temperatures different from those just suggested by way of illustration and likewise the instrument can be used for other purposes than transformer control. It is further to be understood that the operation of the several switches and the index are not dependent in any way upon the employment of a multiple bulb arrangement such as that of the patent above referred to but that in most situations a single bulb will be ample. Moreover, while the instrument chosen by way of illustration is a thermally sensitive device, the bulb 24 having rigid walls and containing a thermally expansible fluid, the instrument may also be employed to respond to pressure variations in which case the bulb 24 may have yieldably resilient walls and may, if desired, contain liquid, for instance oil or glycerine.

While one certain desirable embodiment has been illustrated by way of example, it is to be understood that the invention is not limited to this precise embodiment, but is to be regarded as broadly inclusive of any and all modifications such as fall within the scope of the appended claims.

I claim:

1. An instrument of the class described comprising a case, a plurality of switch motor units within the case, each unit comprising a support having a rear portion designed to contact the forward surface of the rear wall of the case and a forwardly directed clamping portion, a Bourdon tube of small diameter fixed at its normally stationary end to the clamping portion of said support, a switch attached to the front face of the rear portion of said support, such switch being outside the arc of said Bourdon tube, and means operative to transmit movement from the movable tip of the Bourdon tube to the said switch, said motion transmitting means being arranged to be operatively effective only at a predetermined point in the range of travel of the tube, the support of one of said units having a second forwardly directed clamping portion, a Bourdon tube of relatively large diameter, fixed at its normally stationary end to the clamping portion of said supports, which last-named tube embraces within its arc the small Bourdon tube and the switch which are mounted on said last-named support, all of the Bourdon tubes being disposed in substantially the same plane, an index pivotally mounted upon the support which carries the large Bourdon tube, means transmitting motion from the movable tip of the latter tube to the index, a bulb for pressure fluid, and conduit means connecting said bulb to the fixed ends of the several Bourdon tubes.

2. An instrument of the class described comprising a case, a plurality of switch-motor units within the case, each unit comprising a support having a rear portion designed to lie substantially parallel to the inner face of the rear wall of the case, and a forwardly directed portion, a Bourdon tube of relatively small diameter fixed at its normal stationary end to the forwardly directed portion of said support, a switch mounted on said support, said switch comprising an actuator and the movable tip of said tube being provided with a contact element normally spaced from but engageable with said actuator when the tube tip reaches a predetermined definite point in its range of movement, and fastening means uniting the switch to its support and also uniting the support to the case, a Bourdon tube of relatively large diameter arranged within the case, supporting means to which the normally stationary end of said large tube is fixed, said large tube embracing in its arc the tube and switch of one of said switch-motor units, a movable index within the case, means for transmitting motion from the movable tip of the large tube to the index, all of the tubes being disposed substantially in the same plane, a fluid-containing bulb, and conduit means connecting the bulb to the fixed end of each of the Bourdon tubes within the case.

3. An instrument of the class described comprising a case, a plurality of switch-motor units within the case, each unit comprising a support of sheet material having a rear portion designed to engage the inner face of the rear wall of the case, and a forwardly directed part, a Bourdon tube fixed at its normally stationary end to the forwardly directed part of said support, a switch engaging the forward face of the rear portion of the support, and fasteners extending through the rear portion of the support and uniting the switch and support to the rear wall of the case, the Bourdon tubes of all units lying in substantially the same plane, a fluid-containing bulb, and conduit means connecting the bulb to each of the Bourdon tubes within the case.

ELMER H. HAMMOND.